(12) United States Patent
Jain et al.

(10) Patent No.: US 10,606,924 B2
(45) Date of Patent: Mar. 31, 2020

(54) CONTEXTUAL FILE MANAGER

(71) Applicant: Microsoft Technology Licensing, LLC, Redmond, WA (US)

(72) Inventors: Raju Jain, Kirkland, WA (US); Anshul Rawat, Kirkland, WA (US); Aaron Naoyoshi Sheung Yan Woo, Bellevue, WA (US); Elizabeth Picchietti Salowitz, Seattle, WA (US); Mohammed Amirali Samji, Redmond, WA (US); David Ben Perry, Redmond, WA (US); Robert Paul St. Pierre, Redmond, WA (US); John Heinrich Lueders, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 128 days.

(21) Appl. No.: 15/374,728

(22) Filed: Dec. 9, 2016

(65) Prior Publication Data

US 2018/0143947 A1 May 24, 2018

Related U.S. Application Data

(60) Provisional application No. 62/424,320, filed on Nov. 18, 2016.

(51) Int. Cl.
*G06F 3/048* (2013.01)
*G06F 17/21* (2006.01)
(Continued)

(52) U.S. Cl.
CPC .......... *G06F 17/212* (2013.01); *G06F 16/168* (2019.01); *H04L 67/42* (2013.01); *H04L 67/1097* (2013.01)

(58) Field of Classification Search
CPC ....... G06F 3/0481; G06F 3/04812; G06F 8/38
See application file for complete search history.

(56) References Cited

U.S. PATENT DOCUMENTS

| 7,139,757 B1 | 11/2006 | Apollonsky et al. |
| 9,436,351 B2 | 9/2016 | Kurtz et al. |
(Continued)

FOREIGN PATENT DOCUMENTS

WO    WO-2008124049    10/2008

OTHER PUBLICATIONS

Walter Glenn, "How to Remove programs from the "open with" context menu in windows", Oct. 2016, 6pgs, Glenn.pdf.*

(Continued)

*Primary Examiner* — Haoshian Shih

(57) ABSTRACT

A contextual file manager is described herein. Contextual information regarding files and folders of a file system of an operating system is collected. The contextual information may be collected from a variety of different sources, such as contents of the file or folder, an application associated with the file, a service provider, or a cloud storage service. The contextual information is then exposed in a file system interface of the operating system along with representations of the files and folders. In some cases, the contextual information is exposed in response to detection of an intuitive user action to a representation of one of the files or folders via the file system interface.

20 Claims, 9 Drawing Sheets

(51) Int. Cl.
*H04L 29/06* (2006.01)
*G06F 16/16* (2019.01)
*H04L 29/08* (2006.01)

(56) References Cited

U.S. PATENT DOCUMENTS

| | | | |
|---|---|---|---|
| 2003/0142123 A1* | 7/2003 | Malamud | G06F 3/04812 715/715 |
| 2003/0164862 A1 | 9/2003 | Cadiz et al. | |
| 2005/0228801 A1* | 10/2005 | Peters | G06F 8/38 |
| 2006/0036568 A1 | 2/2006 | Moore et al. | |
| 2006/0107234 A1 | 5/2006 | Tudor et al. | |
| 2006/0242603 A1 | 10/2006 | Wong et al. | |
| 2007/0239697 A1 | 10/2007 | Chen et al. | |
| 2008/0244460 A1* | 10/2008 | Louch | G06F 9/453 715/711 |
| 2008/0307363 A1 | 12/2008 | Jalon et al. | |
| 2010/0118025 A1 | 5/2010 | Smith et al. | |
| 2012/0023109 A1 | 1/2012 | Stememann et al. | |
| 2012/0084644 A1 | 4/2012 | Robert et al. | |
| 2015/0074525 A1 | 3/2015 | Costenaro et al. | |
| 2015/0186008 A1 | 7/2015 | Hicks | |
| 2016/0127383 A1* | 5/2016 | Childs | G06F 17/30876 726/30 |

OTHER PUBLICATIONS

Jon Schneider, "Jon Schneider's Tech blog", Jan. 2007, 6 pgs, Schneider.pdf.*
Scott,"Looks Good Works Well", http://looksgoodworkswell.blogspot.in/2005/11/musings-on-mouse-hover.html, Nov. 10, 2005, 12 pages.
Spool,"What do you call those hover-revealing layered-on-top contextual menus?", https://www.uie.com/brainsparks/2011/02/20/what-do-you-call-those-hover-revealing-layered-on-top-contextual-menus/, Feb. 20, 2011, 6 pages.
International Search Report and Written Opinion Issued in PCT Application No. PCT/US2017/061212, dated Feb. 8, 2018, 9 Pages.

* cited by examiner

CONTEXTUAL FILE MANAGER

PRIORITY

This application claims priority to U.S. Provisional Patent Application Ser. No. 62/424,320 filed on Nov. 18, 2016, the disclosure of which is incorporated by reference herein in its entirety.

BACKGROUND

Conventionally, in order to locate information about a file or a folder, users must open the file itself, or navigate to various different locations that are difficult to find. Doing so is both time consuming and frustrating to users who are unable to efficiently locate pertinent information about a file or folder.

SUMMARY

A contextual file manager is described herein. Contextual information regarding files and folders of a file system of an operating system is collected. The contextual information may be collected from a variety of different sources, such as contents of the file or folder, an application associated with the file, a service provider, or a cloud storage service. The contextual information is then exposed in a file system interface of the operating system along with representations of the files and folders. In some cases, the contextual information is exposed in response to detection of an intuitive user action to a representation of one of the files or folders via the file system interface.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the following discussion.

DETAILED DESCRIPTION

Overview

Figure 1:
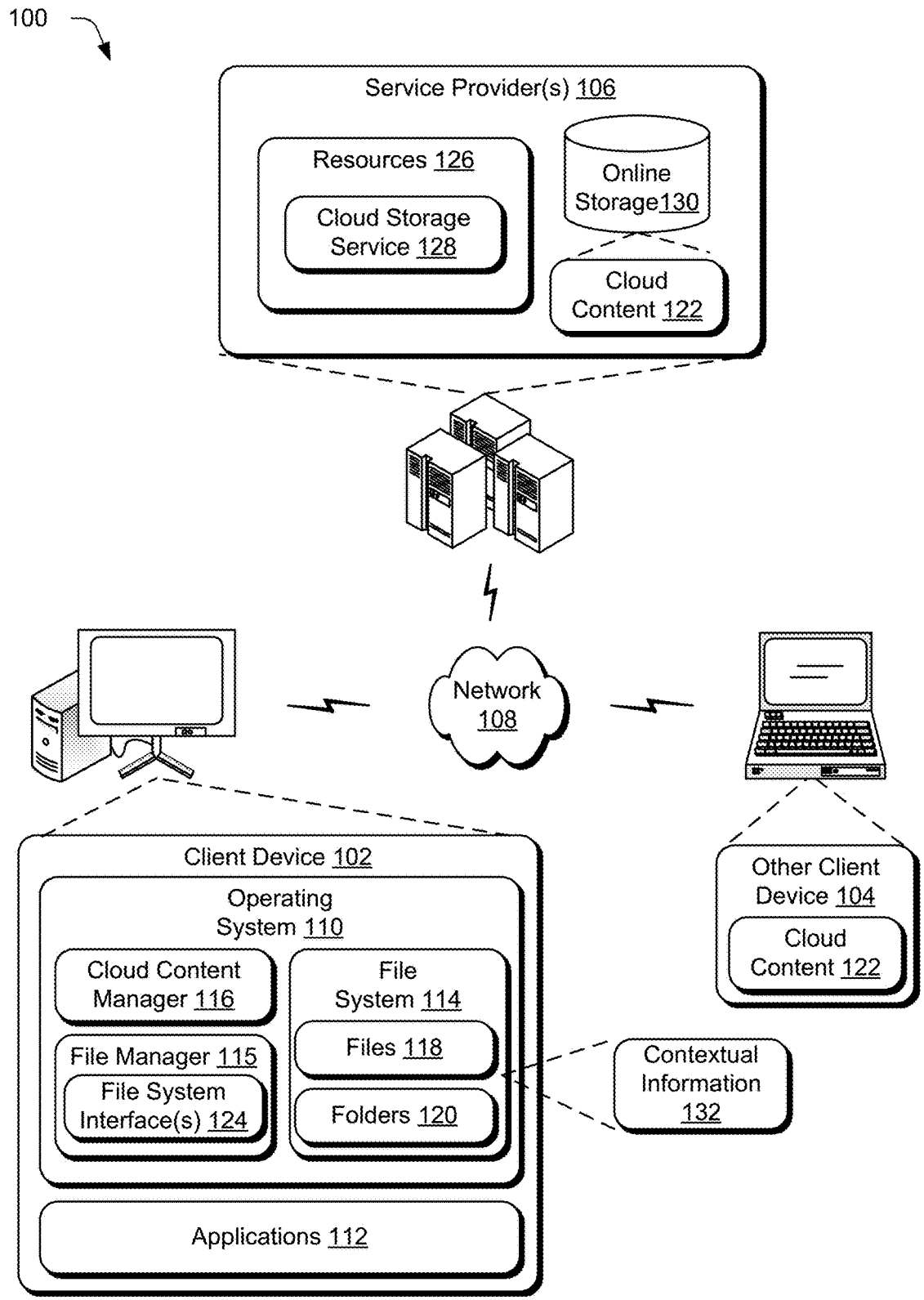
FIG. 1 is an illustration of an example operating environment that is operable to employ techniques described herein.

A contextual file manager is described herein. The contextual file manager ("file manager") enables user navigation among files or content maintained in a file system of an operating system (OS) of a device, such as word processing files, image files, video files, audio files, and so forth. As described herein, a file or file object is distinguishable from an application. The file manager collects and aggregates contextual information associated with a file or folder from a variety of different sources, such as the contents of the file or folder itself, metadata associated with the file or folder, an application associated with the file or folder, and various different service providers.

The contextual information is then made accessible to the user in a file system user interface to enable the user to quickly and efficiently view the contextual information, or take other quick actions with respect to the file or folder, without opening the file or folder. In some cases, the contextual information is exposed to the user "on demand" in response to an intuitive user action. For example, the file manager can cause the contextual information to be presented in a pop-up element in response to a "hover action", in which the user controls a mouse cursor to "hover" over a representation of the file in the file system interface. Other intuitive user actions are also contemplated, such as a tap and hold action with the user's finger for a touchscreen device, striking a particular key on a keyboard, and so forth. The intuitive user actions are distinguishable from other user actions to open the file or folder. For example, the user may be able to double click a file representation in order to open the file, but simply hover over the file representation in order to quickly and efficiently view the contextual information of the file.

In some cases, the contextual information can be presented in a fixed location in the file system interface. For example, the contextual information can be presented in a "details pane" of the file system interface in response to detection of a hover action to a representation of a file or folder. Contextual information may also be persistently presented in fixed locations in the file system interface, such as by presenting contextual information in an information bar that is proximate a file address bar at the top of the file system interface.

The file system interface provided by the contextual file manager is an improvement over current approaches in which users take a variety of different actions to locate contextual information regarding a file or folder. By collecting and aggregating the contextual information from a variety of different sources, the file manager exposes the pertinent and consumable contextual information in an easy to view format that can be accessed via intuitive user actions or persistently presented at fixed locations in the file system interface. Thus, the contextual file manager enables users to efficiently interact with files and folders in the file system interface. That is, through the use of the file manager, contextual information regarding files and folders can be more quickly and efficiently provided to users in a desirable format. Moreover, the described techniques reduce user frustration by removing the need for the user to immerse themselves within the file by searching throughout the contents of the file, or other locations, in order to locate pertinent contextual information for the file.

Example Environment

FIG. 1 is an illustration of an environment 100 in an example implementation that is operable to employ techniques described herein. The illustrated environment 100 includes a client device 102, an other client device 104, and a service provider 106 that are communicatively coupled via a network 108. The client device 102, other client device 104, and service provider 106 may be implemented by one or more computing devices and also may be representative of one or more entities.

A computing device may be configured in a variety of ways. For example, a computing device may be configured as a computer that is capable of communicating over the network 108, such as a desktop computer, a mobile station, an entertainment appliance, a set-top box communicatively coupled to a display device, a wireless phone, a game console, and so forth. Thus, the computing device may range from full resource devices with substantial memory and processor resources (e.g., personal computers, game consoles) to a low-resource device with limited memory and/or processing resources (e.g., traditional set-top boxes, handheld game consoles). Additionally, although a single computing device is shown in some instances, the computing device may be representative of a plurality of different devices, such as multiple servers of the service provider 106 utilized by a business to perform operations, and so on. Further examples of computing systems and devices suitable to implement techniques described herein are described below in relation to FIG. 9.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

The client device 102 is further illustrated as including an operating system 110. The operating system 110 is configured to abstract underlying functionality of the underlying device to applications 112 that are executable on the client device 102. For example, the operating system 110 may abstract processing, memory, network, and/or display functionality such that the applications 112 may be written without knowing "how" this underlying functionality is implemented. The application 112, for instance, may provide data to the operating system 110 to be rendered and displayed by a display device as illustrated without understanding how this rendering will be performed. A variety of applications 112 typically associated with client devices are contemplated including, but not limited to, a productivity suite that integrates multiple office productivity modules, a web browser, games, a multi-media player, a word processor, a spreadsheet program, a photo manager, and so forth.

The client device 102 is also illustrated as including a file system 114, a contextual file manager 115 ("file manager 115"), and a cloud content manager 116. In this example, the file system 114, file manager 115, and cloud content manager 116 are depicted as being implemented as components of the operating system 110. Alternatively, one or more of the file system 114, file manager 115, and cloud content manager 116 may be provided as a standalone application and/or as a component of another application 112.

The file system 114 represents functionality to define and control the way in which files 118 are named and where they are placed logically for storage and retrieval. As described herein, files 118 correspond to file objects or content, such as word processing files, image files, video files, audio files, to name just a few. Thus, files 118 are distinguishable from applications 112. For example, applications 112 may be configured to launch, create, and or edit files 118, but are not specifically files themselves.

The file system 114 may employ a hierarchical (tree) structure. In this approach, files 118 are organized in folders 120, or directories, that correspond to space in memory allocated to the files 118. The file system 114 also includes a format for specifying the path to a file 118 through the structure of folders 120 or directories. The file system 114 can employ paths that point to various storage locations, such as an internal hard drive, an external storage device, and network file locations. In accordance with techniques described in this document, the file system 114 also supports enumeration of cloud content files associated with one or more online providers. The file system 114 in conjunction with the operating system 110 exposes the cloud content files in various views of the file system structure alongside and in the same manner as local, offline files.

The cloud content manager 116 represents client-side functionality to enable various synchronization of various files 118 over the network 108. For example, the client device 102 may include local storage that may be used to store local files 118 as well as cloud content 122 the may be synchronized with other devices (e.g., "synched files"). The cloud content manager 116 may operate to connect to multiple cloud content services provided by service providers 106 to perform file synchronization and related operations. By way of example, cloud content 122 is shown in FIG. 1 as being associated with other client device 104, but may also be associated with client device 102 as a file 118 or folder 120. In this context, cloud content 118 may represent local versions of files that are maintained in respective local storage of multiple different devices and that may be synchronized across the multiple different devices via cloud content managers 116 deployed to the devices. The cloud content 122 may also include representations for and/or links to un-synced files that are maintained in remote, online storage accessible via cloud storage providers. As noted, the file system 114 is configured to manage and provide representations of both local and online files in common views available via the operating system 110 and through file access functionality of various applications 112. The file system representations may be presented in various different forms and views via file system interfaces 124 output via the file manager 115 of operating system 110.

The service provider 106 includes functionality operable by the service provider 106 to manage various resources 126 that may be made available over the network 108. For example, various resources 126 may be provided via webpages or other user interfaces that are communicated over the network for output by one or more clients via a web browser or other client application. The service provider 106 manages access to the resources 126, performance of the resources, and configuration of user interfaces to provide the resources 126, and so on. The service provider 106 may represent one or more server devices used to provide the various resources 126.

Generally, resources 126 made accessible by a service provider 106 may include any suitable combination of services and/or content typically made available over a network by one or more providers. Some examples of services include, but are not limited to, a search service, an email service, an instant messaging service, an online productivity suite, and an authentication service to control access of clients to the resources 126. Content may include various combinations of text, multi-media streams, documents, application files, photos, audio/video files animations, images, web pages, web applications, device applications, content for display by a browser or other client application, and the like.

One particular example of a resource 126 that may be provided by a service provider 106 is a cloud storage service 128 as depicted in FIG. 1. In this context, the cloud storage service 128 is representative of functionality operable to provide and manage online storage 130 that may be allocated to user accounts associated with a service provider 106. The online storage 130 provides users with storage "in the cloud" for cloud content 122 such as documents, application files, photos, mobile uploads, and audio/video files so users may access their content items from anywhere over the network 108, and share content to collaborate with others. The cloud storage service 128 also enables users to synchronize files across multiple different devices designated by the users. Multiple cloud storage services provided by third parties (e.g., other providers) may also provide respective storage and file synchronization. Thus, cloud content 122 may be synchronized across multiple devices via different cloud storage services through interaction with corresponding cloud content managers 116 deployed to client devices.

Clients may access the cloud storage service 130 and other resources 126 provided by a service provider 106 through client/user accounts to which the clients are authenticated. For instance, to access resources 126, a client device may provide a username and password that is authenticated by an authentication service. When the authentication is successful (e.g., the client "is who they say they are"), the authentication service may pass a token (or other suitable authentication identifier/secret) to enable access to corresponding resources. A single authentication may correspond to one or more resources, such that authentication to a single account by a "single sign-on" may provide access to individual resources, resources from multiple service providers 106, and/or to an entire suite of resources available from a service provider 106.

File manager 115 represents functionality to manage user access to files 118 and folders 120 of file system 120. For example, file manager 116 may control the display of representations (e.g., icons) of files 118 and folders 120 in file system interface 124 to enable user access to the files and folders of file system 114. In addition, file manager 116 collects and aggregates contextual information 132 associated with respective files 118 and folders 120. File manager 115 collects the contextual information 132 from various different sources, such as the content of the file 118 or folder 120 itself, metadata associated with the file 118 or folder 120, an application 112 associated with the file 118 (e.g., a word processing application that is associated with a word document), as well as service providers 106, and cloud storage service 128 via cloud content manager 116.

Thus, the contextual information 132 may correspond to both information about the file 118 or folder 120 itself (e.g., the contents of the file or folder) as well as metadata associated with the file or folder (e.g., metadata regarding users associated with files or folders, activities on the files and folders, dates associated with creating or modifying files and folders, and work flow information). In some cases, the contextual information 132 indicates a state of the file or folder (e.g., "protected" or "unprotected") or a state of a workflow related to the file or folder. For example, contextual information regarding a workflow state for a document file could indicate that the "this document has been sent to John to finalize the comment before submission". In some cases, the contextual information 132 may also include a preview of the file 118 or folder 120, such as a preview of the text within a document file, a thumbnail of an image, and so forth. In some implementations, the contextual information 132 can be presented in conjunction with an indication of a user action that can be initiated from the file system interface 124, such as viewing a larger version of an image file, playing a song file, playing a movie file, or sharing a file or folder with other users.

In some implementations, the contextual information 132 is based on information stored in the client device 102 on which the operating system 112 is running integrated with cloud content 122. The file manager 115 can interface with cloud content manager 116 in order to collect contextual information regarding cloud content 122. For example, cloud content manager 116 can notify file manager 115 when a user at an other client device 104 updates the cloud content 122, such as by editing a document file, adding files to a shared folder, and so forth.

File manager 115 makes the contextual information 132 readily accessible to users via the file system interface 124 to enable the user to quickly and efficiently view the contextual information 132, or take other quick actions with respect to the file 118 or folder 120, without actually opening the file or folder. File manager 115 can expose the contextual information 132 to the user in the file system interface 124 in a variety of different ways. In some cases, the contextual information 132 is exposed to the user "on demand" in response to intuitive user actions. For example, file manager 115 can cause contextual information 132 to be presented in a pop-up element in response to a "hover action", in which the user controls a mouse cursor to "hover" over a representation of a file 118 or folder 120 presented in the file system interface 124.

Figure 2:
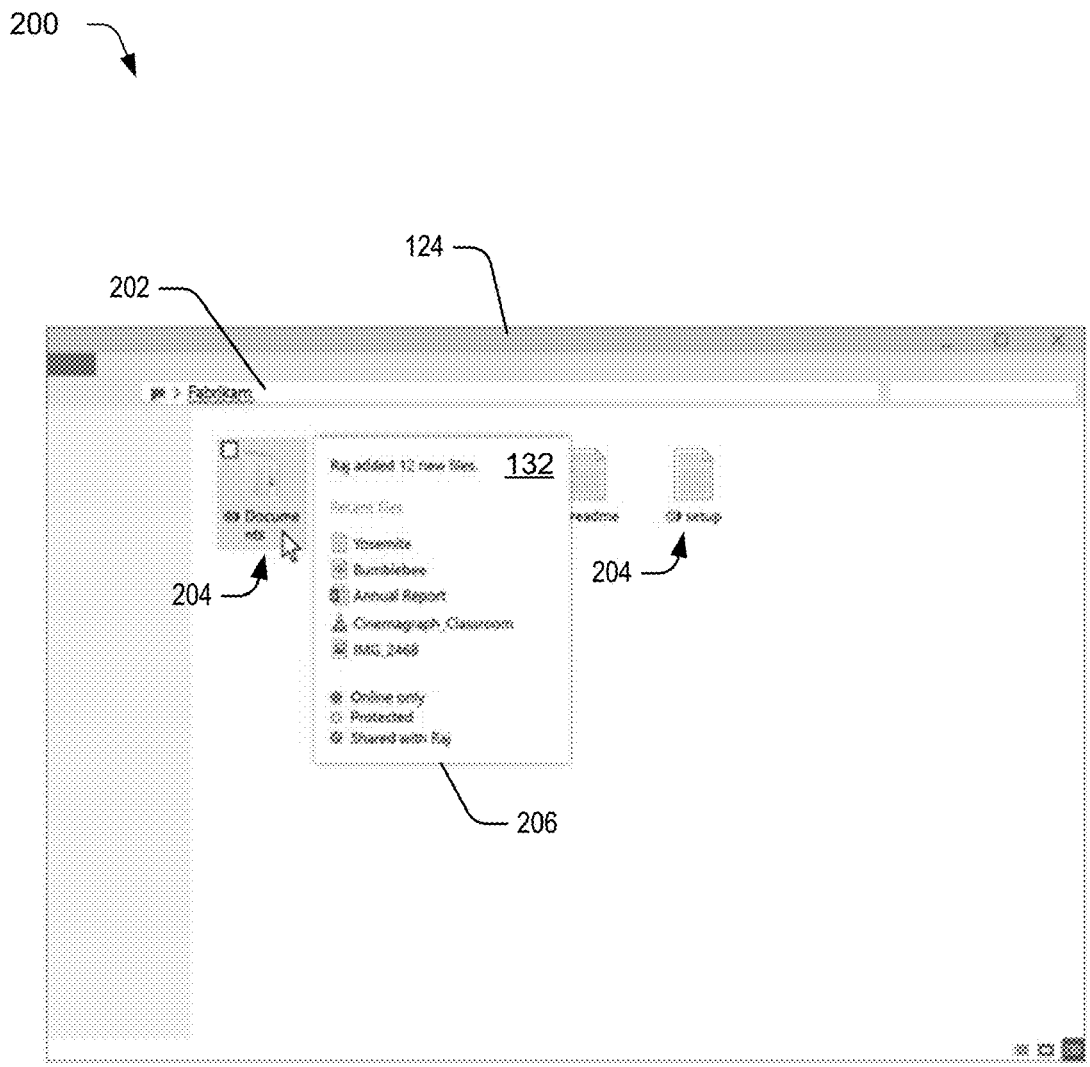
FIG. 2 illustrates an example of a file system interface for exposing contextual information corresponding to a folder in response to an intuitive user action.

As an example, consider FIG. 2, which illustrates an example 200 of a file system interface for exposing contextual information corresponding to a folder in response to an intuitive user action. In this example, file system interface 124 includes a file address bar 202 and representations 204 of one or more files (e.g., a word processing document named "setup") and folders (e.g., a folder named "documents"). The representations of files are selectable to open the file using an appropriate application 112, and the representations of folders are selectable to open the folder to view additional files and/or folders contained within the folder 120. For example, in order to open a file or folder, the user can place a cursor on the appropriate representation 204, and double click the representation.

In this example, file manager 115 exposes contextual information 132 corresponding to the "documents" folder 132 in a pop-up element 206. As described throughout, the contextual information may be collected from a variety of different sources, and may include information corresponding to the content of the file or folder, as well as metadata associated with the file or folder. Generally, the contextual information 132 exposed by file manager 115 includes information that is most useful to the user as "glanceable information". In other words, information that the user can quickly analyze and is useful, as opposed to information that may take more time to comprehend. In this example, the contextual information 132 includes indications of a number of new files that were recently added to the folder, the name of the user that added the files, names of the recently added files, and that the folder is available only online, that the file is protected, and that the folder is shared with another user and the name of that user.

The exposure of contextual information 132, in this case, is "on demand", meaning that the contextual information is not persistently displayed in the file system interface 124. Instead, file manager 115 exposes the contextual information 132 in response to an intuitive user action to the representation 204 of the folder 120, which is distinguishable from user actions or input to open or launch a file or folder. In this example, the contextual information 132 is presented on demand in response to a "hover action", in which the user controls a cursor of an input device (e.g., a mouse) to hover over the position of the representation 204 of the documents folder without "clicking" an input button. The hover action is considered to be "intuitive", because it is a natural action that a user might take to reveal contextual information about a file or folder. Of course, file manager 115 may be configured to present the contextual information in response to other intuitive user actions as well, such as a "tap and hold" action, a particular keyboard stroke, and so forth. Importantly, file manager 115 can distinguish the intuitive user actions, to view contextual information, from other actions with representations 204. For example, the user may be able to double click a representation 204 in order to open the respective file or folder, but simply hover over the representation 204 in order to expose the contextual information 132.

Notably, file manager 115 causes display of the pop-up element 206 proximate the representation 204 of the folder, which enables the user to easily view the contextual information 132 without moving their gaze to different locations in the file system interface 124. Furthermore, exposing the contextual information 132 on demand in response to intuitive user actions enables the user to quickly browse through multiple different files and folders in order to quickly view contextual information associated with different files and folders. For example, the user can hover over a representation of a file or folder to see contextual information, and then when the user moves the cursor to hover over another representation the previous contextual information is removed and new contextual information is displayed.

Figure 3:
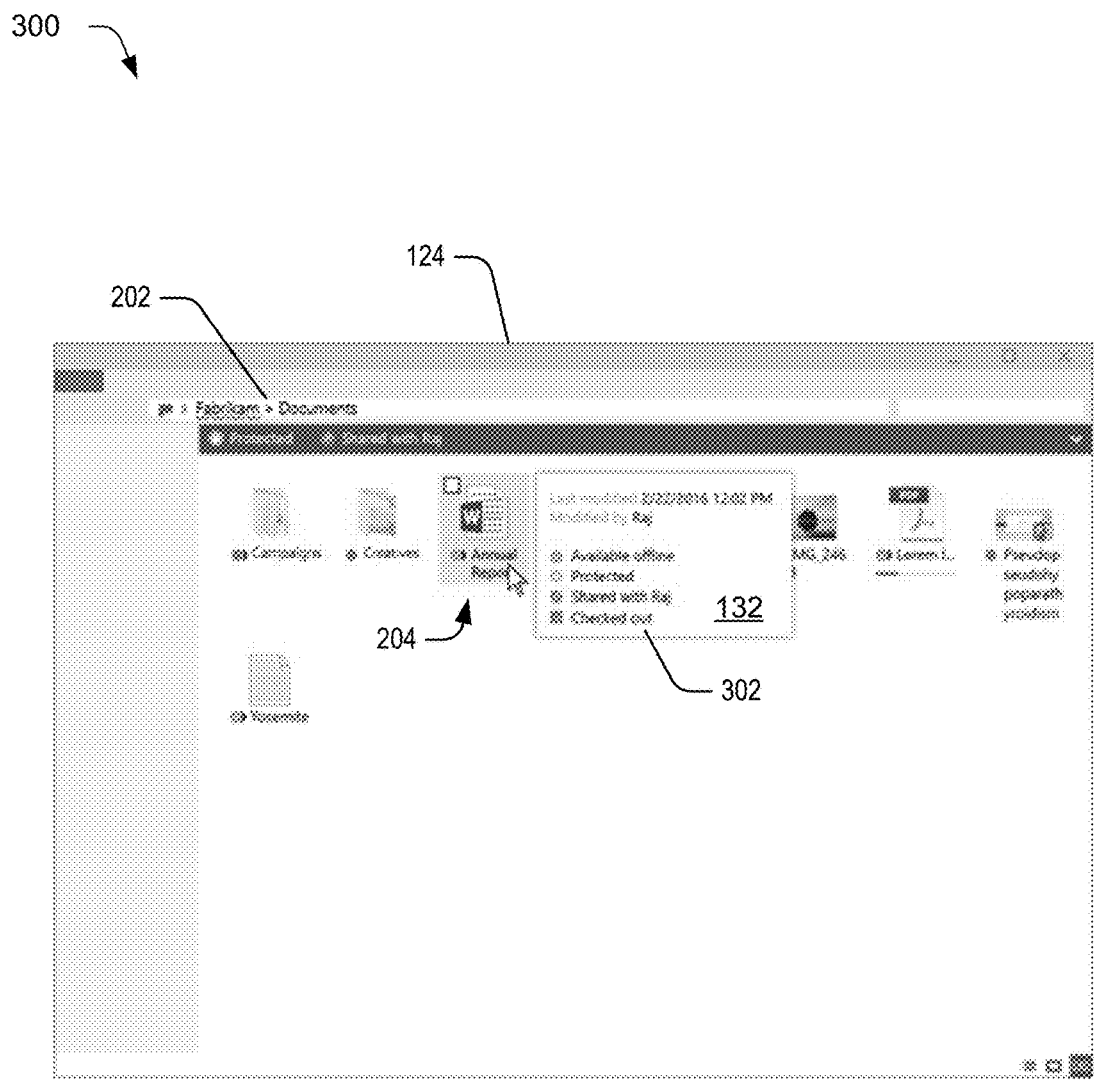
FIG. 3 illustrates an example of a file system interface for exposing contextual information corresponding to a file in response to an intuitive user action.

As another example of exposing contextual information on demand and in response to intuitive user actions, consider FIG. 3 which illustrates an example 300 of a file system interface for exposing contextual information corresponding to a file in response to an intuitive user action. In this example, the user has opened the documents folder of FIG. 2, such as by double-clicking the representation 204 of the documents folder. In response to this user action, file system interface 124 presents representations 204 of files and folders within the documents folder.

Next, in response to a hover action over a representation 204 of a file 118 titled "Annual Report", file manager 115 exposes contextual information 132 corresponding to the file 118 in a pop-up element 302. In this case, the contextual information 132 includes indications of the time and the date that the file was last modified, the name of the user that modified the file, that the file is available offline, that the file is protected, the name of a user that the file is shared with, and that the file is checked out.

In one or more implementations, file manager 115 may expose an indication of one or more quick actions that a user can take with regards to a file or folder. Examples of quick actions that can be exposed by file manager 115 may include, by way of example and not limitation, viewing an image, playing back a song or video, or sharing a file or folder with other users. The indication of the quick action may be exposed along with the contextual information 132 such that the user is able to easily view the contextual information 132 or initiate the quick action from the file system interface 124.

Figure 4:
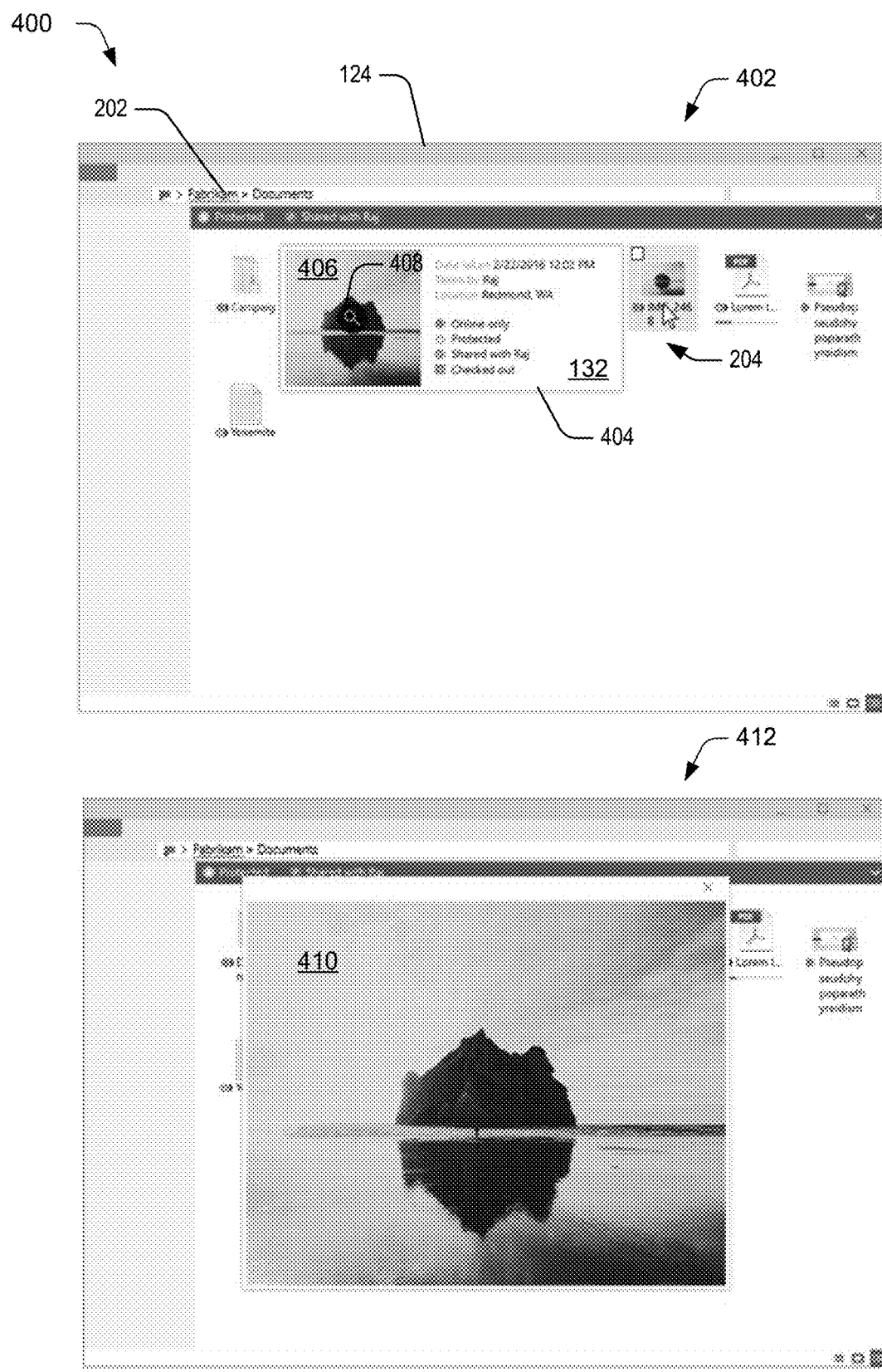
FIG. 4 illustrates an example 400 of a file system interface for exposing contextual information along with an indication of a quick action corresponding to a file.

As an example, consider FIG. 4 which illustrates an example 400 of a file system interface for exposing contextual information along with an indication of a quick action corresponding to a file. In this example, at 402, in response to a hover action over a representation 204 of an image file, file manager 115 exposes contextual information 132 corresponding to the image file 118 in a pop-up element 404. In this case, the contextual information 132 includes indications of the time and the date that the image was captured, the name of the user that captured the image, the location at which the image was captured, that the file is available only online, that the file is protected, that the file is shared with another user and the name of the user, and that the file is checked out. In addition, the pop-up element 404 exposes a preview 406 of the image file, which in this case corresponds to a thumbnail view of the image file.

Additionally, file manager 115 exposes an indication 408 of a quick action that the user can take with respect to the image file, which in this case corresponds to an icon of a magnifying glass indicating that the preview 406 may be selected in order to view a larger version of the image file. Thus, if the user clicks the preview 406, a larger version 410 of the image file is displayed, which is shown at 412. In some cases, manager causes the image to be launched in an application. For example, an image application can be called to display the larger version of the file. Alternately, the file manager can display the larger image of the file within the operating system shell.

Figure 5:
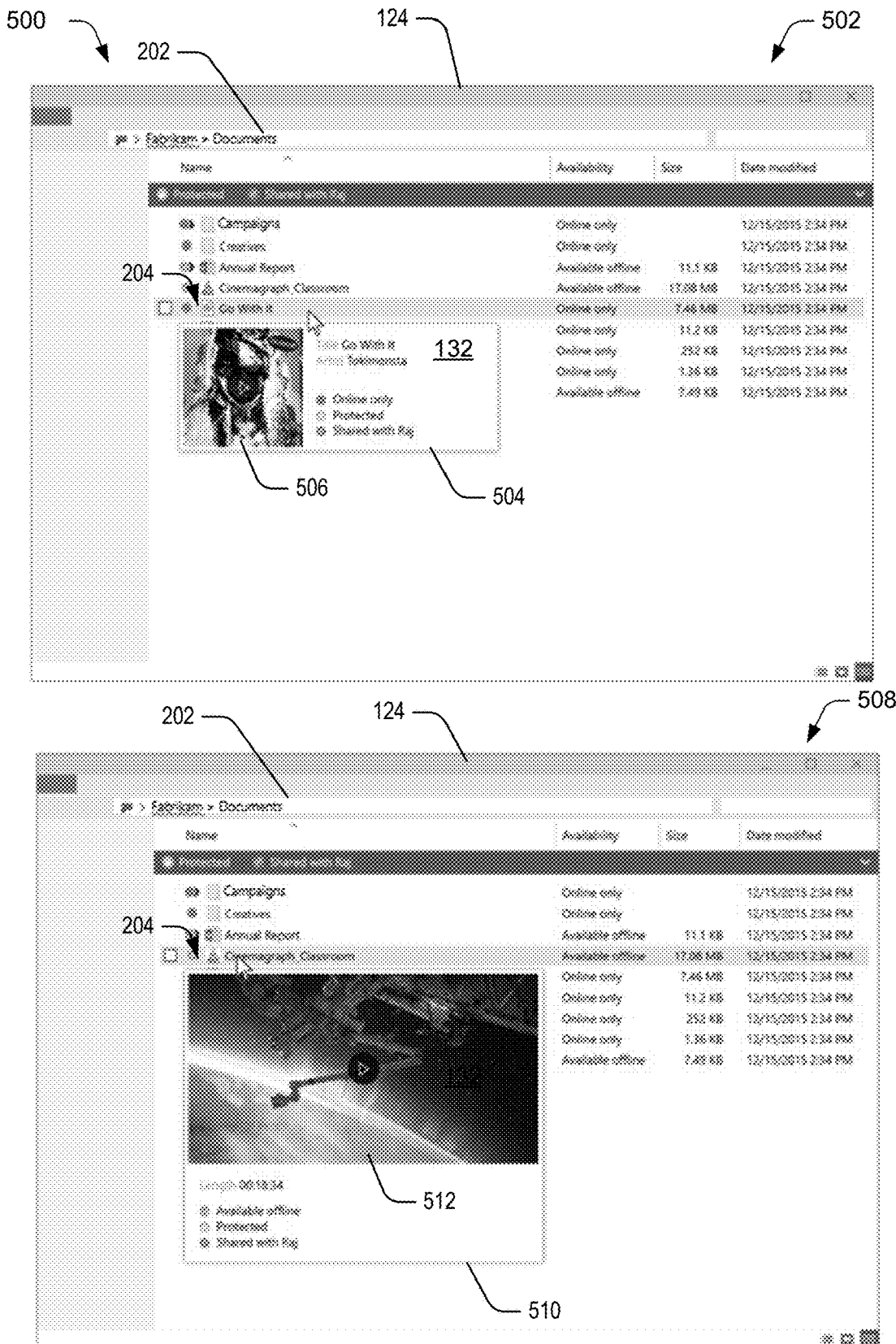
FIG. 5 illustrates an additional example of a file system interface for exposing contextual information along with an indication of a quick action corresponding to a file.

As another example of exposing quick actions, consider FIG. 5 which illustrates an additional example 500 of a file system interface for exposing contextual information along with an indication of a quick action corresponding to a file.

In this example, at 502, in response to a hover action over a representation 204 of an audio file, file manager 115 exposes contextual information 132 corresponding to the audio file 118 of a song in a pop-up element 504. In this case, the contextual information 132 includes a title of the song, an artist of the song, and indications that the file is available only online, that the file is protected, and that the file is shared with another user and the name of the user. In addition, the pop-up element 504 exposes a preview 506 of the audio file, which corresponds to cover art for the song. Additionally, file manager 115 exposes an indication of a quick action that the user can take with respect to the audio file, which in this case corresponds to a playback icon indicating that the preview 506 may be selected in order to playback the audio file. Thus, if the user clicks the preview 506, file manager 115 causes the audio file to begin playback, such as by launching a media player to playback the audio file.

Similarly, at 508, in response to a hover action over a representation 204 of a video file, file manager 115 exposes contextual information 132 corresponding to the video file 118 in a pop-up element 510. In this case, the contextual information 132 includes indications that the video file is available offline, that the file is protected, and that the file is shared with another user and the name of the user. In addition, the pop-up element 510 exposes a preview 512 of the video file, which in this case corresponds to an image frame from the video file. Additionally, file manager 115 exposes an indication of a quick action that the user can take with respect to the video file, which in this case corresponds to a playback icon indicating that the preview 512 may be selected in order to playback the video file. Thus, if the user clicks the preview 512, file manager 115 causes the video file to begin playback, such as by launching a media player to playback the video file.

In some cases, rather than presenting the contextual information in a pop-up element that pops up proximate a representation of a file or folder, the contextual information can be exposed in a fixed location of the file system interface 124. For example, file manager 115 can cause contextual information 132 to be presented in a "details pane" of the file system interface 124 in response to a user action to a representation of a file or folder, or any other suitable user action.

Figure 6:
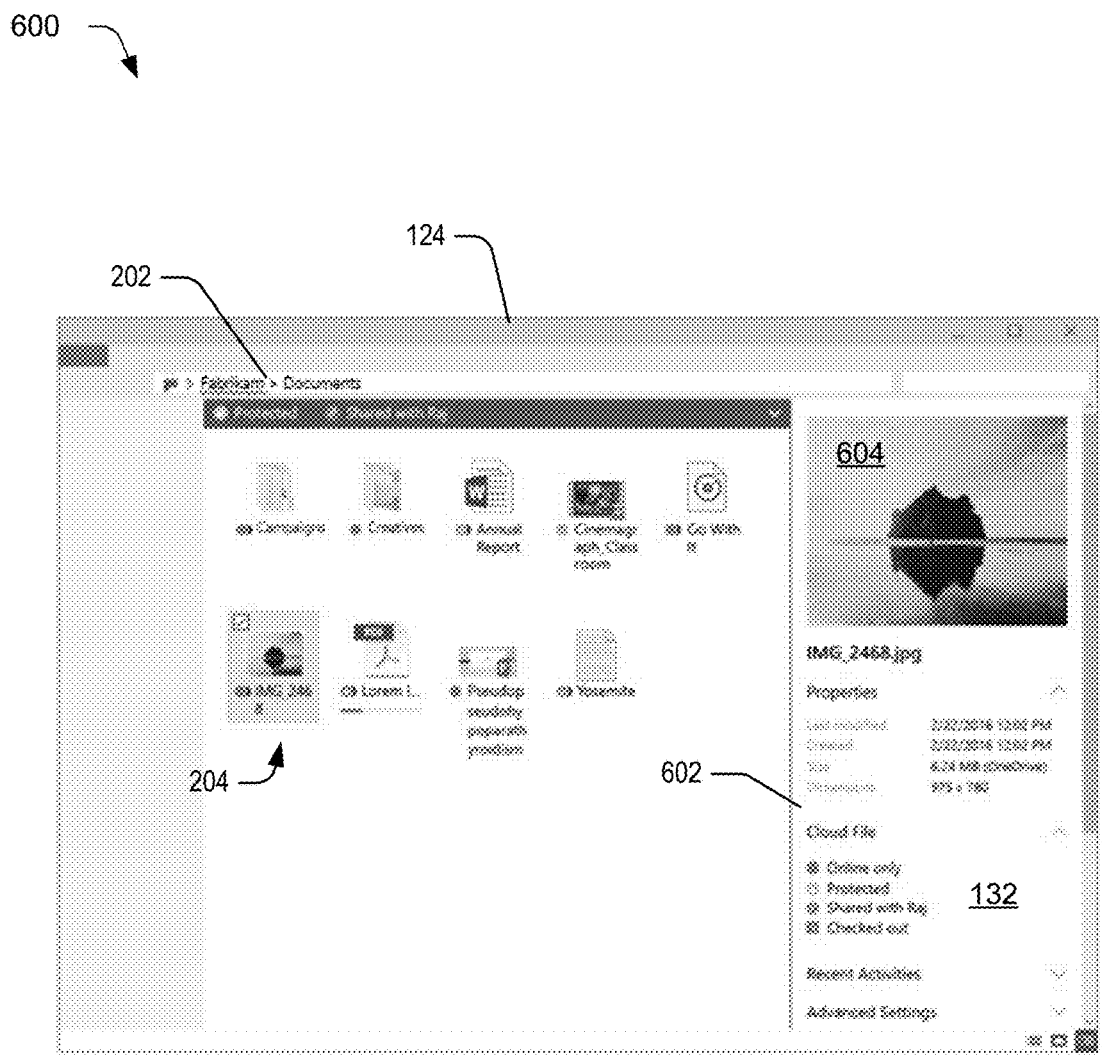
FIG. 6 illustrates an example of a file system interface for exposing contextual information corresponding to folder in a fixed location responsive to an intuitive user action.

As an example, consider FIG. 6, which illustrates an example 600 of a file system interface for exposing contextual information corresponding to folder in a fixed location responsive to an intuitive user action.

In this example, the user has selected a representation 204 of an image file, by clicking a check box proximate the representation 204 to cause the box to be checked. In response to this user action, file manager 115 exposes contextual information 132 corresponding to the image file 118 in a details pane 602 of the file system interface 124. In this example, the details pane 602 is positioned in a fixed location on the right hand side of the file system interface 124. Of course, the details pane could alternately be positioned in other fixed locations of the file system interface 124, such as at the bottom of the file system interface 124.

In this case, the contextual information 132 includes indications of the time and the date that the file was last modified, the time and date that the file was created, the size of the file, dimensions of the file, that the file is stored in the cloud, that the file is available only online, that the file is protected, that the file is shared with another user and the name of the user, and that the file is checked out. In addition, the details pane enables the user to view additional information by taking a further action. For example, the user can interact with the details pane 602 in order to view other recent activities or advanced settings. In addition, the details pane 602 exposes a preview 604 of the file or folder, which in this case corresponds to a thumbnail view of the selected image file. Notably, therefore, contextual information 132 and preview 604 are presented within a single user interface element, which in this example corresponds to the details pane 602. Additionally, file manager 115 can be implemented to expose a quick action, such as by displaying an icon of a magnifying glass indicating that the preview 604 may be selected in order to view a larger version of the image file, as discussed with regards to FIG. 4.

Notably, in this example, the contextual information 132 exposed in the details pane 602 may be more detailed than the contextual information exposed in the pop-up elements discussed with regards to FIGS. 2, 3, and 4. This may be part of an intentional design in which a snapshot of contextual information 132 may be exposed to users in response to intuitive user actions, thereby enabling users to quickly view pertinent contextual information 132. However, the user can then perform a different user action, such as selection of a checkbox proximate the representation, in order to view more detailed information in the details pane 602. Alternately, the pop-up elements and details pane could expose the same types of contextual information 132 or be accessed using any type of user action. For example, the contextual information 132 could be exposed in the details pane 602 in response to a hover action over the representation of the file.

In some cases, rather than presenting the contextual information on demand in response to a user actions, such as in a pop-up element or details pane, the contextual information 132 may be persistently exposed in the file system interface 124. For example, file manager 115 can expose the contextual information 132 in an information bar that is proximate the file address bar 202 at the top of the file system interface 124.

Figure 7:
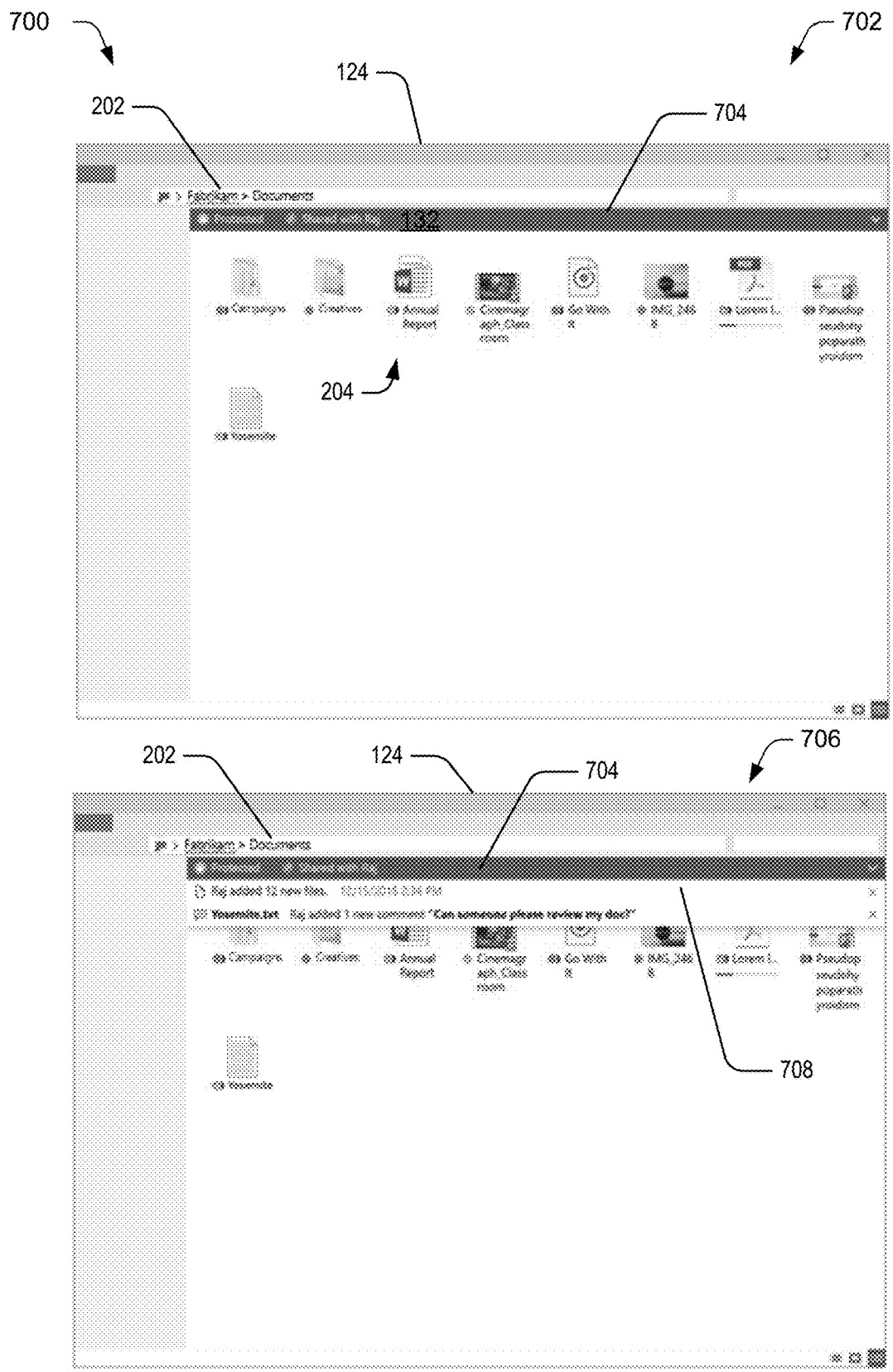
FIG. 7 illustrates an example of a file system interface for persistently exposing contextual information in a file system interface.

As an example, consider FIG. 7, which illustrates an example 700 of a file system interface for persistently exposing contextual information in a file system interface. At 702, file manager 115 exposes contextual information 132, corresponding to the documents folder depicted in FIG. 2, in an information bar 704 of the file system interface 124. Notably, the contextual information is persistently exposed in the information bar 704, which is located at a fixed location in file system interface 124. If the user opens another folder, however, the contextual information 132 exposed in the information bar 704 is modified by file manager 115 to reflect contextual information 132 associated with the newly opened folder. In this example, the contextual information 132 includes indications that the documents folder is protected, and that the documents folder is shared with a user and a name of that user.

In one or more implementations, the information bar 704 is selectable to expose additional contextual information 132. For example, at 706, in response to user input (e.g., selection of a drop-down arrow in the information bar 703), file manager 115 exposes additional contextual information 132 in a drop down element 708. The additional contextual information 132, in this example, includes an indication of a number of files that were recently added to the folder, a name of the user that added the files, and an indication of a comment left by the user regarding a text document contained within the folder. Notably, therefore, the additional contextual information 132 exposed in the drop down element may be more detailed than the contextual information 132 persistently exposed in the information bar 704.

File manager 115 may have access to a wide variety of different types of contextual information 132 for a particular file 118 or folder 120. In some cases, file manager 115 filters the contextual information 132 that is exposed via the file system interface 124 based on a user's current context, such as a current user activity, a time of day (e.g., morning or evening), a location of the user (e.g., at home or at the office), and so forth. In other words, file manager 115 can expose different subsets of the contextual information 132 based on the user's context such that the most pertinent contextual information 132, for the user's current context, is exposed through the file system interface 124. For example, if the user is currently organizing photos, file manager 115 can expose contextual information 132 that helps the user distinguish and organize the photos, such as information about the date, time, and location that a photos was taken. In this instance, less useful information, such as whether the photo is protected or an online or offline states of the photo, may be filtered from the exposed contextual information 132. As another example, if the user is collaborating on a shared document with other users, file manager 115 can expose contextual information 132 related to the shared document workflow, such as user comments and edits, while filtering information that is less useful for this activity, such as a date and time that the document was originally created.

Example Procedures

The following discussion describes contextual file manager techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the example environment, scenarios, and user interfaces discussed in relation to FIGS. 1 to 7. In at least some embodiments, the procedures may be performed by a suitably configured computing device, such as a client device that includes or otherwise makes use of a file system 114 and/or a file manager 115.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 8:
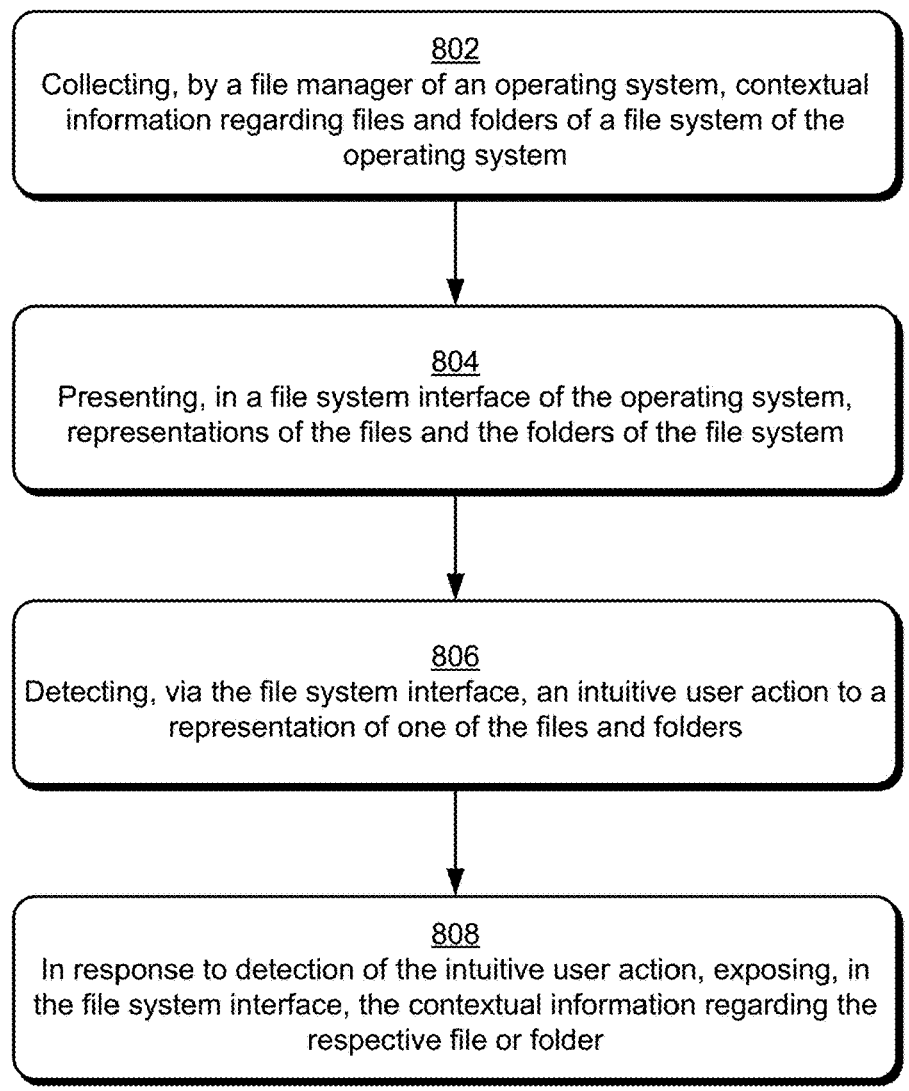
FIG. 8 is a flow diagram depicting an example procedure to expose contextual information in a file system interface of an operating system in accordance with one or more implementations.

FIG. 8 is a flow diagram depicting an example procedure 800 to expose contextual information in a file system interface of an operating system in accordance with one or more implementations.

At 802, a file manager of an operating system collects contextual information regarding files and folders of a file system of the operating system. For example, file manager 115 of operating system 110 collects contextual information 132 regarding files 118 and folders 120 of file system 114 of the operating system.

At 804, representations of the files and folders of the file system are presented in a file system interface of the operating system. For example, file manager 115 presents representations 204 of files 118 and folders 120 of the file system 124 in file system interface 124 of operating system 110.

At 806, an intuitive user action to a representation of one of the files or folders is detected via the file system interface. For example, file manager 115 detects an intuitive user action, such as a hover action, to a representation 204 of a file 118 or folder 120.

At 808, in response to detection of the intuitive user action, contextual information regarding the respective file or folder is exposed in the file system interface. For example, file manager 115 exposes contextual information 132 regarding a respective file 118 or folder 120 in the file system interface 124.

Having considered an example procedure, consider now a discussion of an example system and components of the system that can be employed to implement embodiments of the techniques for a contextual file manager described herein.

Example System and Device

Figure 9:
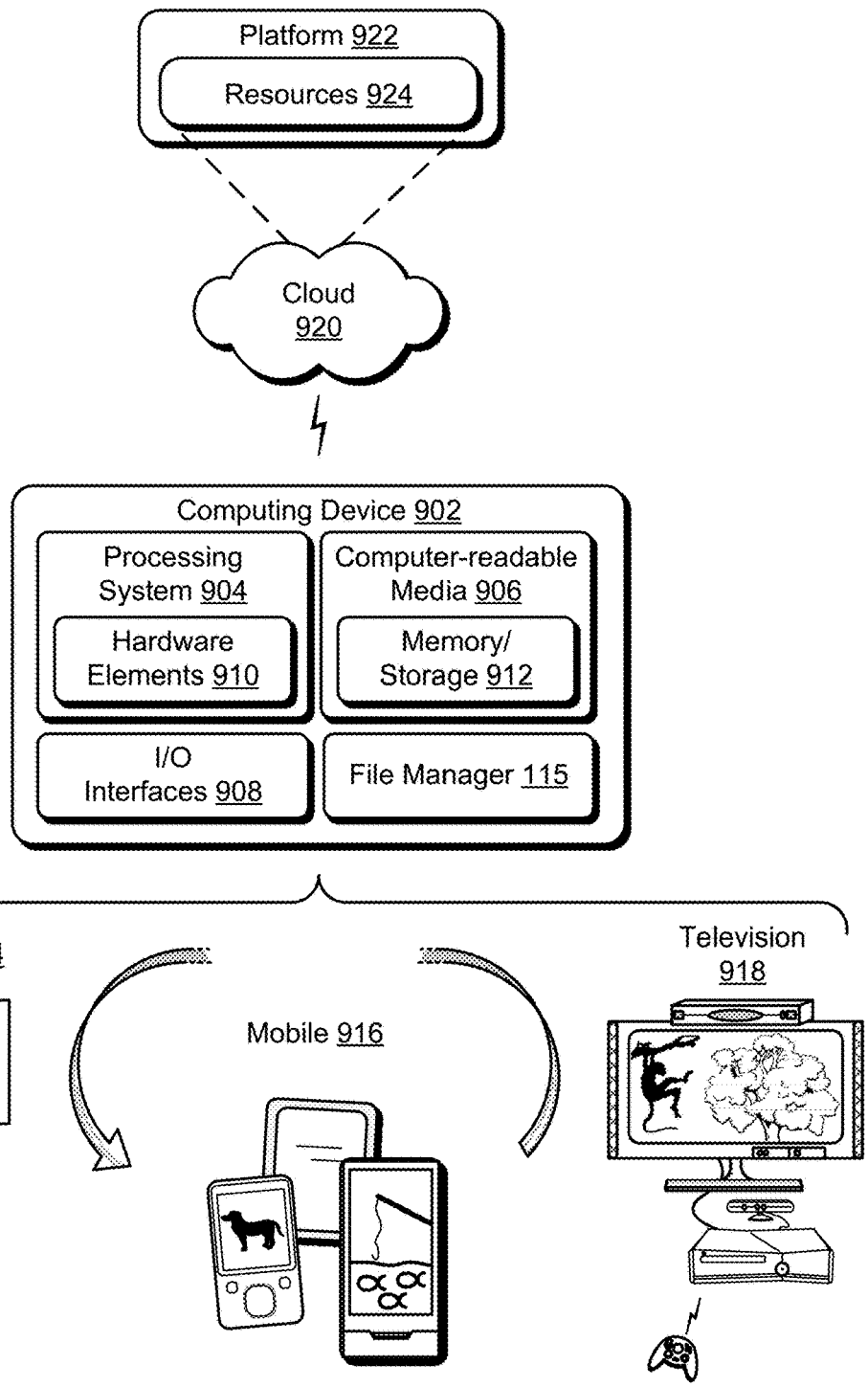
FIG. 9 illustrates an example system that includes an example computing device that is representative of one or more computing systems and/or devices that may implement the various techniques described herein.

FIG. 9 illustrates an example system generally at 1000 that includes an example computing device 902 that is representative of one or more computing systems and/or devices that may implement the various techniques described herein. The computing device 902 may be, for example, a server of a service provider, a device associated with the client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 902, such as via a network. Communication media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including applications 112, file system 114, cloud content manager 116, and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules as a module that is executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, portable music player, portable gaming device, a tablet computer, a multi-screen computer, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. This is illustrated through inclusion of the cloud content manager 116 on the computing device 902. The functionality of the cloud content manager and other modules may also be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

Conclusion and Example Implementations

Example implementations described herein include, but are not limited to, one or any combinations of one or more of the following examples:

A method implemented by a computing device comprising: collecting, by a file manager of an operating system, contextual information regarding files and folders of a file system of the operating system, the contextual information collected from the contents of the file or folder and from one or more other sources; presenting, in a file system interface of the operating system, representations of the files and folders of the file system; detecting, via the file system interface, an intuitive user action to a representation of one of the files or folders; and in response to detection of the intuitive user action, exposing contextual information regarding the respective file or folder in the file system interface.

A method as described above, wherein the contextual information is collected from contents of the file or folder and one or more of an application associated with the file, a service provider, or a cloud storage service.

A method as described above, wherein contextual information comprises contents of the file or folder and metadata associated with the file or folder.

A method as described above, wherein the intuitive user action comprises a hover action over the representation of the file or folder.

A method as described above, wherein the contextual information is exposed in a pop-up element displayed proximate the representation of the file or folder.

A method as described above, wherein the contextual information is exposed in a details pane positioned in a fixed location of the file system interface.

A method as described above, wherein the contextual information is exposed in an information bar positioned proximate a file address bar in the file system interface.

A method as described above, further comprising exposing an indication of a quick action in conjunction with the contextual information.

A method as described above, wherein the contextual information includes a preview of the file or folder.

A computing device comprising: at least a memory and a processor to implement a file manager of an operating system, the file manager configured to perform operations comprising: collecting contextual information regarding files and folders of a file system of the operating system, the contextual information collected from the contents of the file or folder and from one or more other sources; presenting, in a file system interface of the operating system, representations of the files and folders of the file system; and exposing the contextual information in the file system interface.

A computing device as described above, wherein the file manager collects the contextual information from contents of the file or folder and one or more of an application associated with the file, a service provider, or a cloud storage service.

A computing device as described above, wherein contextual information comprises contents of the file or folder and metadata associated with the file or folder.

A computing device as described above, wherein the contextual information is exposed in a details pane positioned in a fixed location of the file system interface.

A computing device as described above, wherein the contextual information is exposed in an information bar positioned proximate a file address bar in the file system interface.

A computing device as described above, wherein the file manager is further configured to expose an indication of a quick action in conjunction with the contextual information.

A computing device as described above, wherein the contextual information includes a preview of the file or folder.

A computing device as described above, wherein the file manager exposes the contextual information in response to detection of an intuitive user action to a representation of one or the files or folders.

A computing device as described above, wherein the intuitive user action comprises a hover action over the representation of the file or folder.

A computing device as described above, wherein the contextual information is exposed in a pop-up element displayed proximate the representation of the file or folder.

One or more computer-readable storage media comprising instructions that, when executed by a client device, implement a file manager of an operating system, the file manager configured to perform operations comprising: collecting contextual information regarding files and folders of a file system of the operating system, the contextual information collected from contents of the file or folder and one or more of an application associated with the file, a service provider, or a cloud storage service; presenting, in a file system interface of the operating system, representations of the files and folders of the file system; and exposing the contextual information in a fixed location of the file system interface.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method implemented by a computing device comprising:
   identifying, by a file manager, contextual information regarding files and folders of a file system that are accessible through an operating system, the contextual information collected from contents of a file or a folder, and from one or more other sources that comprise at least one of: an application associated with the file or the folder, a service provider, or a cloud storage service;
   detecting, via the file manager, a user context through the operating system, wherein the detecting of the user context comprises detecting that one or more files or folders are actively open in an application or service executing on the computing device;
   filtering the identified contextual information based on the detected user context, wherein the filtering filters the contextual information based on the one or more files or folders that are actively open; and
   presenting, through a user interface of the file system, the filtered contextual information.

2. The method of claim 1, wherein the presenting exposes the filtered contextual information in a details pane positioned in a fixed location of the user interface.

3. The method of claim 1, wherein the presenting exposes the filtered contextual information in an information bar positioned proximate a file address bar in the user interface.

4. The method of claim 1, wherein the filtered contextual information includes a preview of the one or more files or folders.

5. A computing device comprising:
   at least a memory and a processor to implement a file manager of an operating system, the file manager configured to perform operations comprising:
      identifying, by the file manager, contextual information regarding files and folders of a file system that are accessible through the operating system, the contextual information collected from contents of a file or a folder, and from one or more other sources that comprise at least one of: an application associated with the file or the folder, a service provider, or a cloud storage service;
      detecting, via the file manager, a user context through the operating system, wherein the detecting of the user context comprises detecting that one or more files or folders are actively open in an application or service executing on the computing device;
      filtering the identified contextual information based on the detected user context, wherein the filtering filters the contextual information based on the one or more files or folders that are actively open; and
      presenting, through a user interface of the file system, the filtered contextual information.

6. The computing device of claim 5, wherein contextual information comprises contents of the one or more files or folders and metadata associated with the one or more files or folders.

7. The computing device of claim 5, wherein the contextual information is exposed in a details pane positioned in a fixed location of the user interface.

8. The computing device of claim 5, wherein the contextual information is exposed in an information bar positioned proximate a file address bar in the user interface.

9. The computing device of claim 5, wherein the file manager is further configured to expose an indication of a quick action in conjunction with the contextual information.

10. The computing device of claim 5, wherein the contextual information includes a preview of the one or more files or folders.

11. The computing device of claim 5, wherein the filtering exposes the contextual information in response to detection of an intuitive user action to a representation of the one or more files or folders.

12. The computing device of claim 11, wherein the intuitive user action comprises a hover action over the representation of the one or more files or folders.

13. The computing device of claim 11, wherein the contextual information is exposed in a pop-up element displayed proximate the representation of the one or more files or folders.

14. One or more computer-readable storage media comprising instructions that, when executed by a client device, implement a file manager, the file manager configured to perform operations comprising:
   identifying, by the file manager, contextual information regarding files and folders of a file system that are accessible through the operating system, the contextual information collected from contents of a file or a folder, and from one or more other sources that comprise at least one of: an application associated with the file or the folder, a service provider, or a cloud storage service;
   detecting, via the file manager, a user context through the operating system, wherein the detecting of the user context comprises detecting that one or more files or folders are actively open in an application or service executing on the computing device;
   filtering the identified contextual information based on the detected user context, wherein the filtering filters the contextual information based on the one or more files or folders that are actively open; and
   presenting, through a user interface of the file system, the filtered contextual information.

15. The method of claim 1, wherein the detecting of the user context further comprises detecting locational data associated with the computing device based on access to the computing device by a user, and wherein the filtering further filters the contextual information for location-specific contextual information based on the detected locational data.

16. The method of claim 1, wherein the detecting of the user context further comprises detecting collaborative access to the one or more files or folders by at least two users, and wherein the filtering further filters the contextual information to identify contextual information related to a shared workflow for the one or more files or folders by the at least two users.

17. The method of claim 1, wherein the detecting of the user context further comprises detecting timestamp data associated with the computing device based on access to the computing device by a user, and wherein the filtering further filters the contextual information for contextual information based on the detected timestamp data.

18. The method of claim 1, wherein the detecting of the user context further comprises detecting that a user is organizing the one or more of files and folders in the application or service, and wherein the filtering further filters the contextual information for contextual information to identify contextual information for organization of the one or more files and folders.

19. The computing device of claim 5, wherein the detecting of the user context further comprises detecting that a user is organizing the one or more files and folders in the application or service, and wherein the filtering further filters the contextual information for contextual information to identify contextual information for organization of the one or more files and folders.

20. The computing device of claim 5, wherein the detecting of the user context further comprises detecting collaborative access to the one or more files or folders by at least two users, and wherein the filtering further filters the contextual information to identify contextual information related to a shared workflow for the one or more files or folders by the at least two users.

\* \* \* \* \*